US012279350B2

(12) United States Patent
Seminara et al.

(10) Patent No.: US 12,279,350 B2
(45) Date of Patent: Apr. 15, 2025

(54) LED ARRAY DRIVER WITH CHANNEL TO CHANNEL AND CHANNEL TO GROUND EXTERNAL PIN SHORT DETECTION

(71) Applicant: STMicroelectronics S.r.l., Agrate Brianza (IT)

(72) Inventors: Maria Francesca Seminara, Catania (IT); Salvatore Rosario Musumeci, Fiumefreddo di Sic (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/672,975

(22) Filed: May 23, 2024

(65) Prior Publication Data

US 2024/0314909 A1 Sep. 19, 2024

Related U.S. Application Data

(62) Division of application No. 17/826,461, filed on May 27, 2022, now Pat. No. 12,028,949.

(51) Int. Cl.
*H05B 45/30* (2020.01)
*H05B 45/46* (2020.01)
(Continued)

(52) U.S. Cl.
CPC ............. *H05B 45/54* (2020.01); *H05B 45/46* (2020.01)

(58) Field of Classification Search
CPC ...... H05B 45/30; H05B 45/37; H05B 45/397; H05B 45/44; H05B 45/46; H05B 45/50; H05B 45/54
See application file for complete search history.

(56) References Cited

U.S. PATENT DOCUMENTS 8,766,546 B2 * 7/2014 Oshima .................. H05B 45/56 315/307
11,089,663 B2 * 8/2021 Nishigami ........... H05B 45/325
(Continued)

FOREIGN PATENT DOCUMENTS

CN 110415639 A 11/2019
CN 210295860 U 4/2020

OTHER PUBLICATIONS

Li, Ziyin et al: System Design for PCB Defects Detection Based on AOI Technology, IEEE, DOI 10.1109/CISP.2011.6100553, Oct. 15-17, 2011.
(Continued)

*Primary Examiner* — Thai Pham
(74) *Attorney, Agent, or Firm* — Crowe & Dunlevy LLC

(57) ABSTRACT

A LED driver chip includes driver circuits, each being coupled to a different pin and including a fault-detection circuit. Each fault-detection circuit includes a force circuit forcing current to a force node, and a sense circuit including a current sensor coupled to the force node, and a comparator comparing a voltage at the force node to a reference voltage to generate a comparison output. Control circuitry, in a pin-to-pin short detection mode, activates the force circuit of a first of the driver circuits and activates thep sense circuit of a second of the driver circuits, in a pin-to-ground short detection mode, activates the force and the sense circuit of the same driver circuits. The comparison output of the comparator of the activated sense circuit, if is higher or if lower of the reference voltage, indicates if short between pin or to ground, respectively, is present.

20 Claims, 10 Drawing Sheets

(51) Int. Cl.

| | |
|---|---|
| ***H05B 45/50*** | (2022.01) |
| ***H05B 45/54*** | (2020.01) |

(56) References Cited

U.S. PATENT DOCUMENTS

| | | | | |
|---|---|---|---|---|
| 2008/0157687 | A1* | 7/2008 | Lin ........................ | H05B 45/10 315/185 S |
| 2013/0127344 | A1 | 5/2013 | Jin et al. | |
| 2016/0212820 | A1 | 7/2016 | Kalkschmidt et al. | |
| 2016/0226373 | A1* | 8/2016 | Pamato .................. | H05B 45/58 |
| 2016/0249432 | A1* | 8/2016 | Zhang .................... | H05B 45/38 |
| 2018/0263088 | A1* | 9/2018 | Liang ..................... | H05B 45/54 |
| 2022/0039237 | A1 | 2/2022 | Mignoli et al. | |
| 2022/0361303 | A1* | 11/2022 | Satterfield .............. | H05B 45/54 |
| 2022/0361305 | A1* | 11/2022 | Chiang .................. | H05B 45/46 |

OTHER PUBLICATIONS

STMicroelectronics: LED1642GW, 16 Channels LED Driver with Error Detection, Current Gain Control and 12/16 Bit PWM Brightness Control, Nov. 2015, 42 pages.

EPO Search Report and Written Opinion for counterpart EP Appl. No. 23173538.2, report dated Oct. 23, 2023, 8 pgs.

* cited by examiner

LED ARRAY DRIVER WITH CHANNEL TO CHANNEL AND CHANNEL TO GROUND EXTERNAL PIN SHORT DETECTION

CROSS REFERENCE TO RELATED APPLICATION

This application is a divisional of U.S. patent application Ser. No. 17/826,461, filed May 27, 2022, the content of which is incorporated by reference in its entirety.

TECHNICAL FIELD

This disclosure is directed to the field of light emitting diode (LED) driving and, in particular, to a driver chip for driving LEDs that includes fault detection circuitry that can determine the presence of a short between adjacent output pins and the presence of a short between an output pin and ground.

BACKGROUND

A driver chip may be used to drive an array of light emitting diodes (LEDs) divided into strings to form an LED lighting system. A sample known LED lighting system 1 is now described with reference to FIG. 1. The LED lighting system 1 includes an LED driver chip 3 that drives an LED array 2. The LED array 2 is separated into strings of series connected light emitting diodes LED_STRING(0), . . . , LED_STRING(n) connected between an LED supply voltage node receiving an LED supply voltage VLED and output pins PIN(0), . . . , PIN(n) of the LED driver chip 3. The LED driver chip 3 includes driver circuits 4(0), . . . , 4(*n*) that are connected to the output pins PIN(0), . . . , PIN(n) to drive the LED strings LED_STRING(0), . . . , LED_STRING(n).

At the time of fabrication, it is desired to verify proper operation of the LED lighting system 1. For example, it is desired to verify that pins of active drivers 4(0), . . . , 4(*n*) are not shorted together during operation, and it is desired to verify that pins of active drivers 4(0), . . . , 4(*n*) are not shorted to ground.

Prior art ways of addressing this utilize test equipment that connects external components to the LED lighting system in order to detect these faults or utilize visual inspection to detect these faults. This adds time and complexity to fabrication and manufacture. Therefore, so as to ease and quicken the process of detecting faults in an LED lighting system, further development is still required.

SUMMARY

Disclosed herein is a light emitting diode (LED) lighting system, including a plurality of strings of LEDs and an LED driver chip with a plurality of driver circuits, each being coupled to a different one of the plurality of strings of LEDs via a respective pin. Each of the plurality of driver circuits includes a fault detection circuit for that driver circuit, and each fault detection circuit includes a force circuit including a current sourcing circuit configured to source a forcing current to a force output node. Each fault detection circuit also includes a sense circuit, with each sense circuit having a current sensor coupled to the force output node, and a comparator configured to compare a voltage at the force output node to a reference voltage and generate a comparison output based thereupon. Control circuitry is configured to, in a pin-to-pin short detection mode, activate the force circuit of a first given one of the plurality of driver circuits and activate the sense circuit of a second given one of the plurality of driver circuits. If the comparison output of the comparator of the activated sense circuit indicates that the voltage at its force output node is greater than the reference voltage, presence of a short between the respective pin for the first given one of the plurality of driver circuits and the respective pin for the second given one of the plurality of driver circuits is indicated.

The control circuitry may be further configured to, in a pin-to-ground short detection mode, activate the force circuit and sense circuit of a given one of the plurality of driver circuits. If the comparison output of the comparator of the given one of the plurality of driver circuits indicates that the voltage at the force output node is less than the reference voltage, presence of a short between the pin for the respective given one of the plurality of driver circuits and ground is determined.

The current sensor may be a resistor connected between the force output node and ground.

The comparator may have a non-inverting terminal coupled to the force output node and an inverting terminal coupled to the reference voltage.

The current sourcing circuit may include a current mirror having an input coupled to a current source sinking a mirror current and an output at which the forcing circuit is sourced as being a scaled version of the mirror current.

Each of the plurality of strings of LEDs may include a plurality of LEDs connected in series between an LED supply voltage node and the pin associated with that one of the plurality of strings of LEDs.

Also disclosed herein is a method of self-testing an LED driver chip for faults, the method including steps of: a) setting n to an initial value; b) activating a force circuit in a fault detection circuit to thereby source a force current to a force output node associated with an n−1th given one of a plurality of fault detection circuits within the LED driver chip; c) activating a sense circuit in a fault detection circuit, the sense circuit being connected to a force output node associated with the nth given one of the plurality of fault detection circuits; and d) determining presence of a short between respective output pins associated with the nth given one of the plurality of LED driver circuits and the n−1th given one of the plurality of LED driver circuits. Step d) is performed by: converting current through the force output node associated with the nth given one of the plurality of LED driver circuits to a sensed voltage; comparing the sensed voltage to a reference voltage; and determining the presence of the short if the sense voltage is greater than the reference voltage. The method also includes step e) if n is less than a total number of the plurality of LED driver circuits within the LED driver chip, iterating n and returning to b).

The force current may be sourced to the force output node associated with the n−1th given one of the plurality of fault detection circuits by causing a multiplexer associated with the force circuit to connect the force current to the force output node associated with the n−1th given one of the plurality of fault detection circuits. The sense circuit may be connected to the force output node associated with the nth given one of the plurality of fault detection circuits by causing a de-multiplexer associated with the sense circuit to connect the sense circuit to the force output node associated with the nth given one of the plurality of fault detection circuits.

Step b) may include activating the force circuit in the fault detection circuit of the n−1th given one of a plurality of LED driver circuits within the LED driver chip to thereby source the force current to the force output node associated with the n−1th given one of the plurality of fault detection circuits. Step c) may include activating a sense circuit in a fault detection circuit of the nth given one of the plurality of LED driver circuits within the LED driver chip, the sense circuit being connected to the force output node associated with the nth given one of the plurality of fault detection circuits.

The method may further include steps of: f) setting m to an initial value; g) causing the force circuit to source a force current to a force output node associated with an mth given one of the plurality of LED driver circuits within the LED driver chip; h) connecting the sense circuit to the force output node of the mth given one of the plurality of LED driver circuits; and i) determining presence of a short between an output pin associated with the mth given one of the plurality of LED driver circuits and ground. Step i) may be performed by: comparing the sensed voltage to a reference voltage; and determining the presence of the short if the sense voltage is less than the reference voltage. The method may also include step j) if m is less than a total number of the LED driver circuits within the LED driver chip, iterating m and returning to g).

Step g) may include activating the force circuit in the fault detection circuit of the mth given one of the plurality of LED driver circuits within the LED driver chip to thereby source the force current to the force output node associated with the mth given one of the plurality of LED driver circuits. Step h) may include activating the sense circuit in the fault detection circuit of the mth given one of the plurality of LED driver circuits within the LED driver chip, the sense circuit connected to the force output node of that mth given one of the plurality of LED driver circuits.

Also disclosed herein is a light emitting diode (LED) lighting system including a plurality of strings of LEDs, and an LED driver chip comprising a plurality of driver circuits, each being coupled to a different one of the plurality of strings of LEDs via a respective pin. A multiplexing circuit has a different respective output connected to each of the plurality of driver circuits, and a de-multiplexing circuit has a different respective input connected to each of the plurality of driver circuits. A fault detection circuit includes a force circuit including a current sourcing circuit configured to source a forcing current to an input of the multiplexing circuit, and a sense circuit. The sense circuit includes a current sensor coupled to an output of the de-multiplexing circuit, and a comparator configured to compare a voltage at the output of the de-multiplexing circuit to a reference voltage and generate a comparison output based thereupon.

Control circuitry is configured to, in a pin-to-pin short detection mode, cause the multiplexing circuit to connect the force circuit to a first given one of the plurality of driver circuits, and cause the de-multiplexing circuit to connect the sense circuit to a second given one of the plurality of driver circuits. If the comparison output of the comparator of the sense circuit indicates that the voltage at the input of the sense circuit is greater than the reference voltage, presence of a short between the respective pin for the first given one of the plurality of driver circuits and the respective pin for the second given one of the plurality of driver circuits is indicated.

The control circuitry may be further configured to, in a pin-to-ground short detection mode, cause the multiplexing circuit to connect the force circuit to a given one of the plurality of driver circuits, and cause the de-multiplexing circuit to connect the sense circuit to the given one of the plurality of driver circuits. If the comparison output of the comparator indicates that the voltage at the input of the sense circuit is less than the reference voltage, presence of a short between the pin for the respective given one of the plurality of driver circuits and ground may be determined.

The current sensor may be a resistor connected between the input of the sense circuit and ground.

The comparator may have a non-inverting terminal coupled to the input of the sense circuit and an inverting terminal coupled to the reference voltage.

The current sourcing circuit may include a current mirror having an input coupled to a current source sinking a mirror current and its output at which the forcing circuit is sourced as being a scaled version of the mirror current.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1:
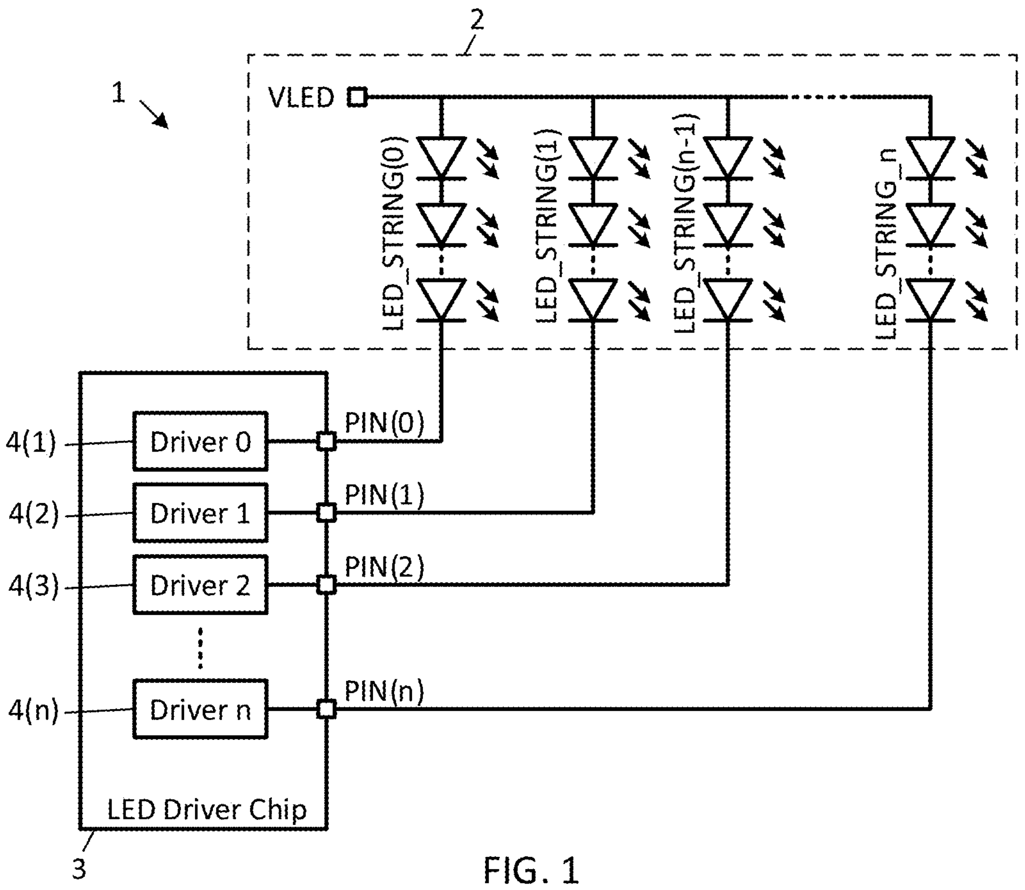
FIG. 1 (Prior Art)
FIG. 1 is a block diagram of a prior art LED lighting system.
Figure 2:
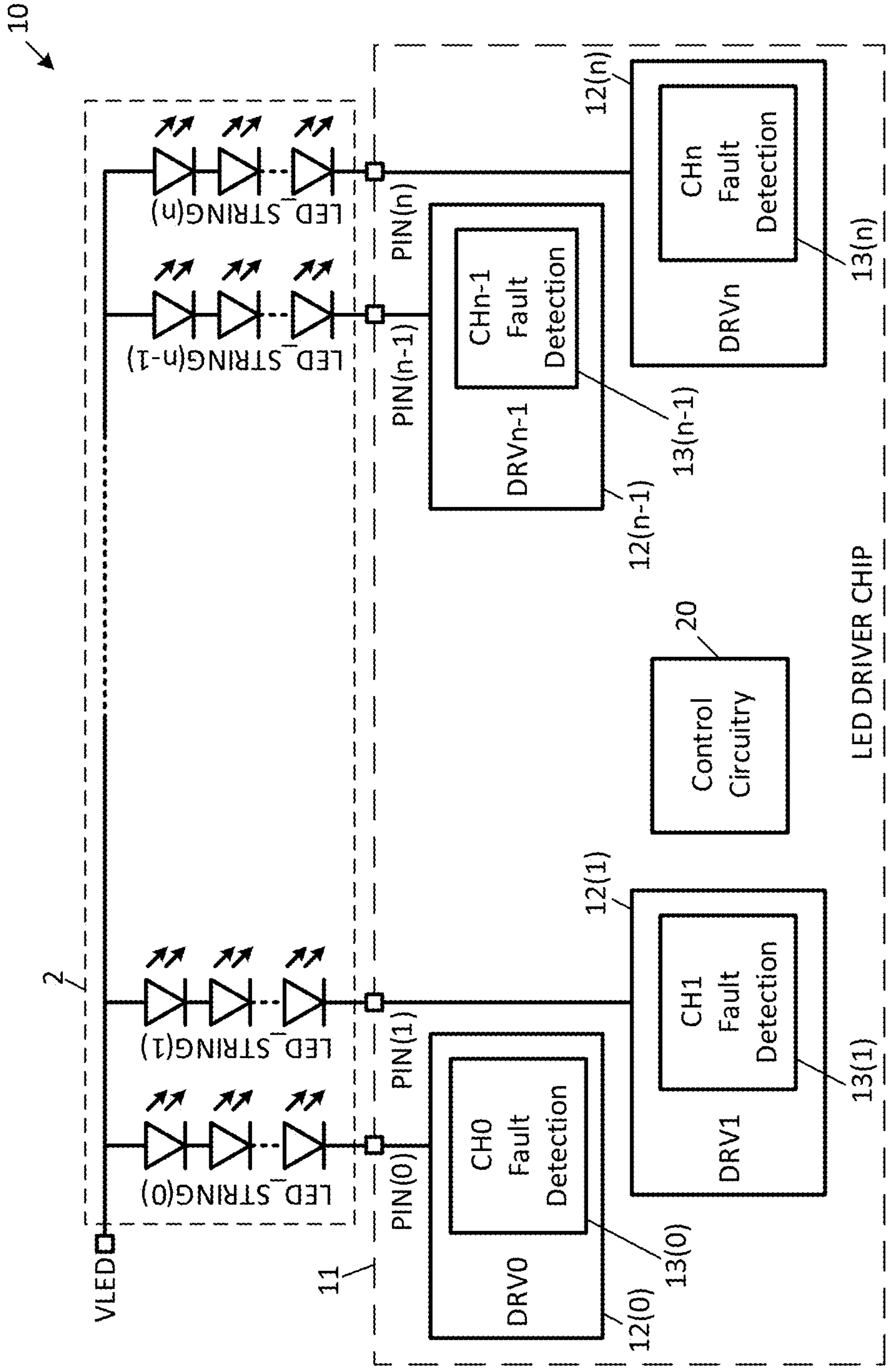
FIG. 2 is a block diagram of an LED lighting system which includes internal fault detection circuits within its driver chip, as disclosed herein.

Disclosed herein with initial reference to FIG. 2 is a light emitting diode (LED) lighting system 10. The LED lighting system 10 includes an LED driver chip 11 that drives an LED array 2. The LED array 2 is separated into strings of series connected light emitting diodes LED_STRING(0), . . . , LED_STRING(n) connected between an LED supply voltage node receiving an LED supply voltage VLED and output pins PIN(0), . . . , PIN(n) of the LED driver chip 11.

The LED driver chip 11 includes driver circuits 12(0), . . . , 12(*n*) that are connected to the output pins PIN(0), . . . , PIN(n) to drive the LED strings LED_STRING (0), . . . , LED_STRING(n). Each driver circuit 12(0), . . . , 12(*n*) may be referred to as a "channel", with driver circuit 12(0) corresponding to channel CH0, driver circuit 12(1) corresponding to channel CH1, and so on until the n−1th driver circuit 12(*n*−1) corresponds to channel CHn−1 and the nth driver circuit 12(*n*) corresponds to channel CHn.

Each driver circuit 12(0), . . . , 12(*n*) has its own dedicated fault detection circuit 13(0), . . . , 13(*n*). The fault detection circuits 13(0), . . . , 13(*n*) facilitate the determination of the presence of shorts between pins of active channels CH0, . . . , CHn during operation, and facilitate the determination of the presence of shorts between pins of active channels CH0, . . . , CHn and ground during operation. Since the driver circuits 12(0), . . . , 12(*n*) are incorporated in the LED driver chip 11, this means that the fault detection circuits 13(0), . . . , 13(*n*) are incorporated in the LED driver chip 11 and perform fault detection without the use of external equipment and without external inspection.

Figure 3:
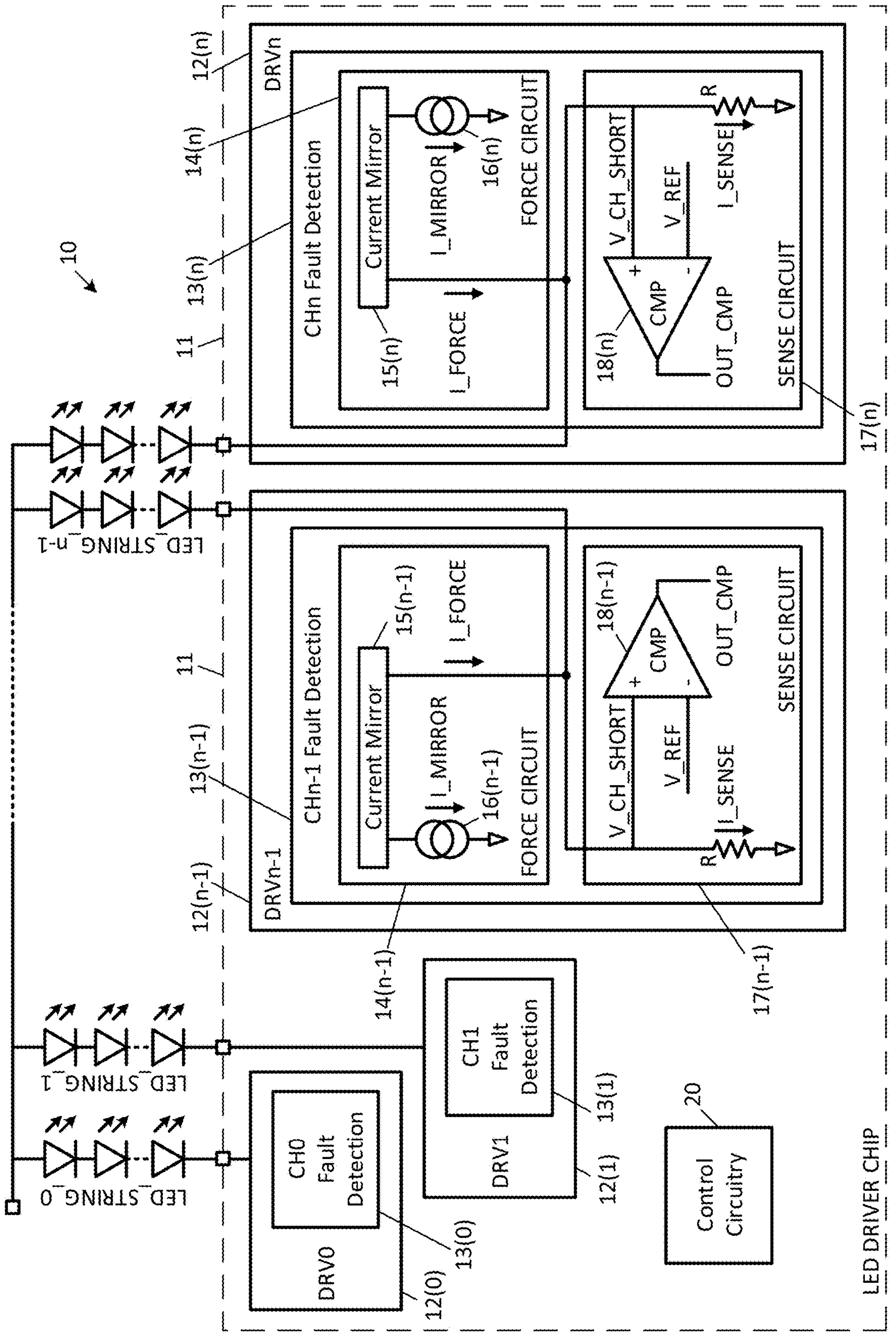
FIG. 3 is a schematic block diagram of the LED lighting system of FIG. 2, showing the details of the force and sense circuits within the fault detection circuits.

Further details of the fault detection circuits 13(0), . . . , 13(*n*) are now given with additional reference to FIG. 3. Each fault detection circuit 13(0), . . . , 13(*n*) includes a force circuit 14(0), . . . , 14(*n*) and a sense circuit 17(0), . . . , 17(*n*). Each force circuit 14(0), . . . , 14(*n*) includes a current mirror 15(0), . . . , 15(*n*) that has a current sink 16(0), . . . , 16(*n*) connected to its input to sink a mirror current I_MIRROR and provides (sources) a scaled force current I_FORCE at its output. The output of each current mirror 15(0), . . . , 15(*n*) is connected to the pin PIN(0), . . . , PIN(n) associated with the driver circuit 12(0), . . . , 12(*n*) in which it resides.

Each sense circuit 17(0), . . . , 17(*n*) includes a resistor R connected between the pin PIN(0), . . . , PIN(n) associated with the driver circuit 12(0), . . . , 12(*n*) in which it resides and ground, with a sense current I_SENSE flowing through the resistor R to ground. Each sense circuit 17(0), . . . , 17(*n*) has a comparator 18(0), . . . , 18(*n*) with its non-inverting input terminal connected to the pin PIN(0), . . . , PIN(n) associated with the driver circuit 12(0), . . . , 12(*n*) in which it resides and with its inverting input terminal coupled to receive a reference voltage V_REF. Each comparator 18(0), . . . , 18(*n*) outputs a respective comparison voltage OUT_CMP.

It should be appreciated that in the example of FIG. 3, the details of the fault detection circuits 13(*n*−1) and 13(*n*) are shown, but each fault detection circuit 13(0), . . . , 13(*n*) has these described components. To that end, each fault detection circuit 13(0), . . . , 13(*n*) includes a respective force circuit 14(0), . . . , 14(*n*) and sense circuit 17(0), . . . , 17(*n*). Each force circuit 14(0), . . . , 14(*n*) includes a current mirror 15(0), . . . , 15(*n*) having current I_MIRROR sunk therefrom at its input and outputting current I_FORCE to its respective pin. Each sense circuit 17(0), . . . , 17(*n*) includes a comparator 18(0), . . . , 18(*n*) having a non-inverting input terminal coupled to receive a voltage V_CH_SHORT across a resistor R coupled between the pin and ground, an inverting input terminal coupled to reference voltage V_REF, and an output generating the signal OUT_CMP.

Control circuitry 20 is configured to selectively activate/deactivate the force circuits 14(0), . . . , 14(*n*) and the sense circuits 17(0), . . . , 17(*n*) to perform the fault detection operation described below.

Figure 4A:
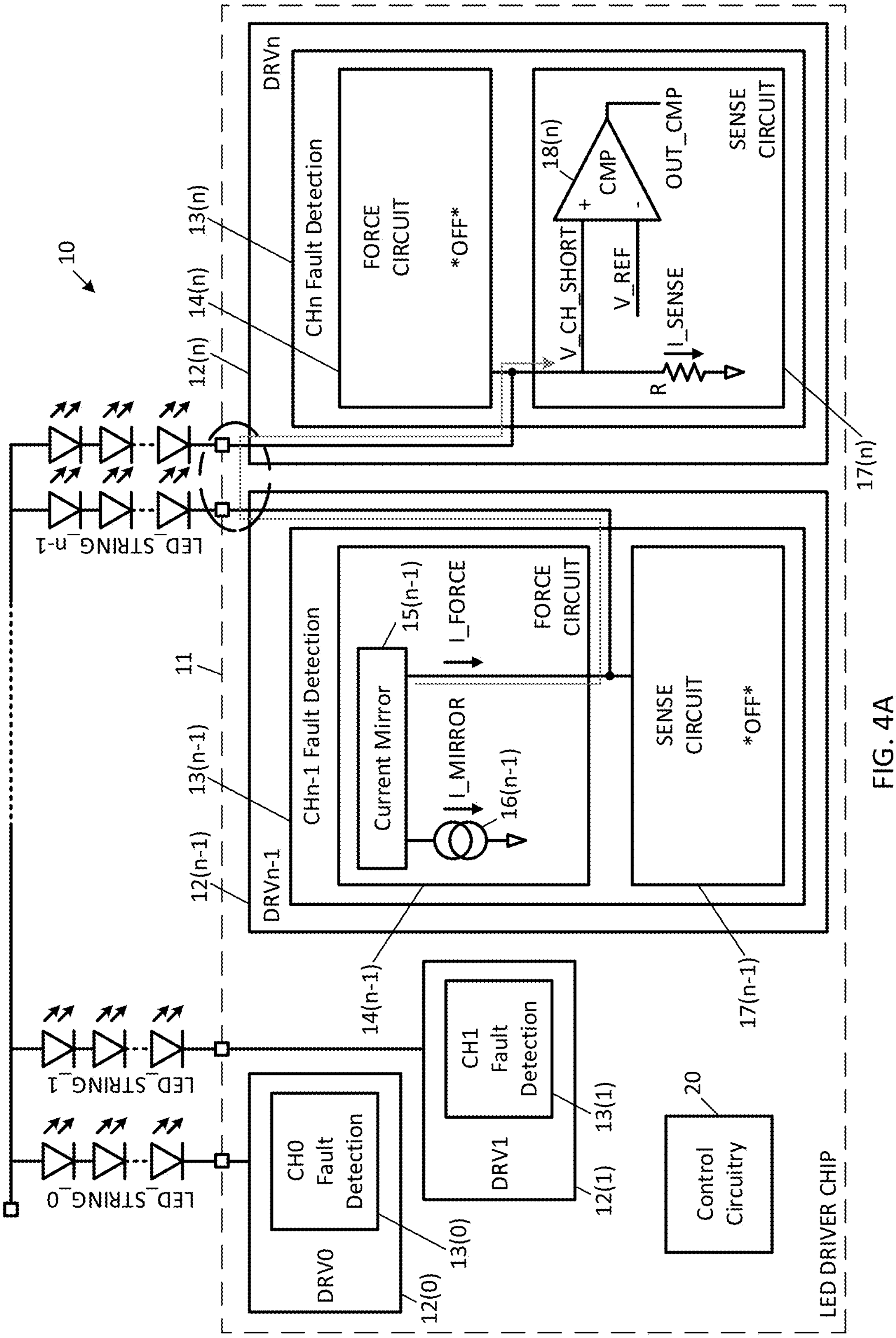
FIG. 4A is a schematic block diagram of the LED lighting system of FIG. 2 when performing fault detection to determine whether adjacent pins associated with different channels are shorted to one another in operation.

Operation of the LED lighting system 10 to perform fault detection is now described with initial reference to FIG. 4A. First, detection of shorts between the pins PIN(0), . . . , PIN(n) of adjacent channels CH0, . . . , CHn is described with reference to FIG. 4A. For example, detection of shorts between channels CH0 and CH1, channels CH1 and CH2, etc., may be performed.

In the illustrated example, detection of shorts between adjacent channels CHn−1 and CHn is performed. To perform this, the force circuit 14(*n*−1) of the driver circuit 12(*n*−1) is activated while the sense circuit 17(*n*) of the driver circuit 12(*n*) is activated, with the sense circuit 17(*n*−1) of the driver circuit 12(*n*−1) and the force circuit 14(*n*) of the driver circuit 14(*n*) remaining deactivated. The activation of the force circuit 14(*n*−1) serves to source the force current I_FORCE to the pin PIN(n−1) associated with the driver circuit 12(*n*−1).

In the absence of a short between pins PIN(n−1) and PIN(n), since the force circuit 14(*n*) is deactivated, the magnitude of the current I_SENSE flowing through the resistor R of the sense circuit 17(*n*) is substantially zero, with the result being that the reference voltage V_REF is greater than the voltage CH_SHORT across the resistor R of the sense circuit 17(*n*)—therefore, the output OUT_CMP of the comparator 18(*n*) is deasserted.

Figure 4B:
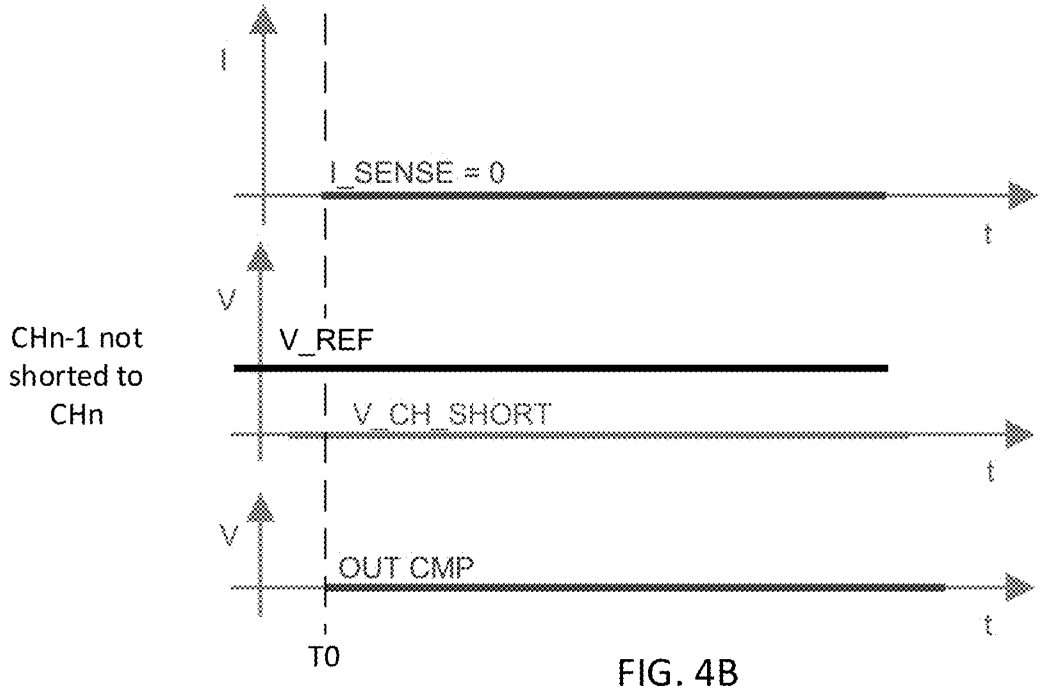
FIG. 4B is a graph showing the operation of the LED lighting system of FIG. 2 when performing fault detection in the absence of a short between adjacent pins associated with different channels.

This scenario can be observed in the graph of FIG. 4B. At time TO, the driver circuits 12(*n*−1) and 12(*n*) are activated, and no short is present between PIN(n−1) and PIN(n). As such, the sense current I_SENSE through resistor R of the sense circuit 17(*n*) is at zero, since no current path between pins PIN(n−1) and PIN(n) is present. Therefore, the voltage V_CH_SHORT remains at ground, which is less than the reference voltage V_REF, so the output OUT_CMP of the comparator 18(*n*) remains deasserted.

However, in the illustrated example, there is in fact a short between PIN(n−1) and PIN(n). As such, when the force circuit 14(*n*−1) is activated, the force current I_FORCE flows out through PIN(n−1), into PIN(n), and through the resistor R of the sense circuit 17(*n*). As a result, the voltage CH_SHORT across resistor R of the sense circuit 17(*n*) will be greater than the reference voltage V_REF, and the output OUT_CMP of the comparator 18(*n*) is asserted.

Figure 4C:
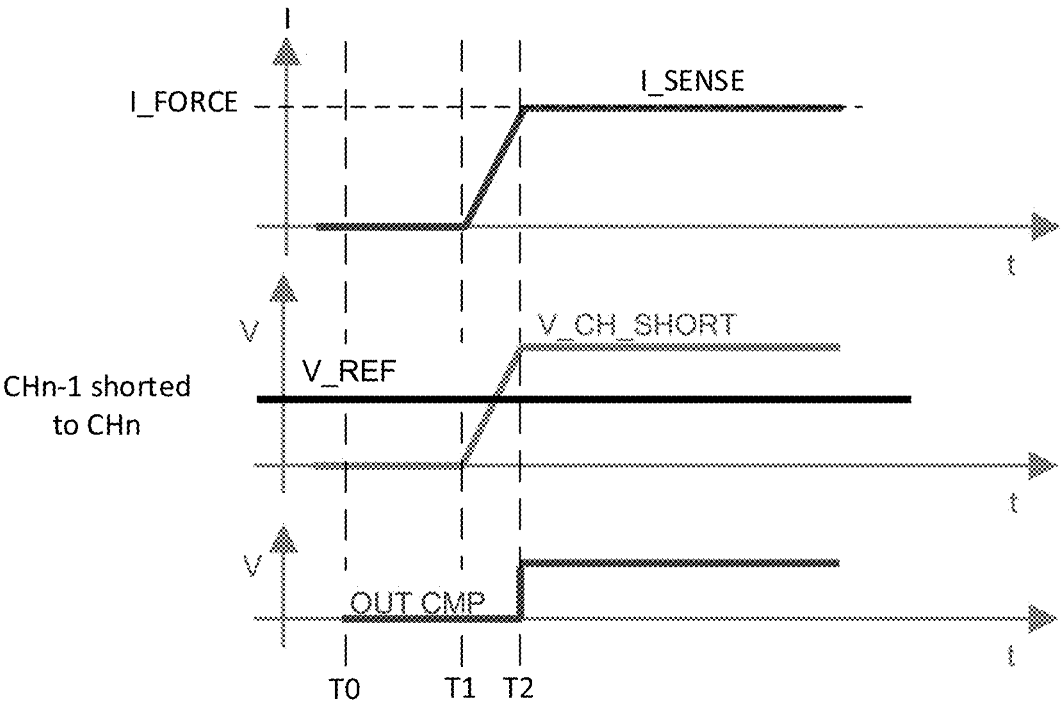
FIG. 4C is a graph showing the operation of the LED lighting system of FIG. 2 when performing fault detection to detect a short between adjacent pins associated with different channels.

This scenario can be observed in the graph of FIG. 4C. At time TO, the driver circuits 12(*n*−1) and 12(*n*) are activated, and no short is present between PIN(n−1) and PIN(n). As such, the sense current I_SENSE through resistor R of the sense circuit 17(*n*) is at zero, since no current path between pins PIN(n−1) and PIN(n) is present. Therefore, the voltage V_CH_SHORT remains at ground, which is less than the reference voltage V_REF, so the output OUT_CMP of the comparator 18(*n*) remains deasserted. At time T1, however, a short becomes present between PIN(n−1) and PIN(n). The sense current I_SENSE through resistor R of the sense circuit 17(*n*) rises to become equal to the force current I_FORCE by time T2 due to the short between PIN(n−1) and PIN(n), causing the voltage V_CH_SHORT to rise above the reference voltage V_REF, so the output OUT_CMP of the comparator 18(*n*) is asserted at time T2 to indicate the presence of a short.

The above technique can be performed to detect a short between any two pins PIN(0), . . . , PIN(n) regardless of whether or not those pins are adjacent (although shorts are more likely to occur between adjacent pins). When testing for shorts between the pins PIN(0), . . . , PIN(n) of two of the driver circuits 12(0), . . . , 12(*n*), it does not matter in which the force circuit 14(0), 14(*n*) is activated and in which the sense circuit 17(0), . . . , 17(*n*) is activated, just that the force circuit 14(0), . . . , 14(*n*) of one driver circuit 12(0), . . . , 12(*n*) is activated and the sense circuit 17(0), . . . , 17(*n*) of another driver circuit 12(0), . . . , 12(*n*) is activated.

Figure 5A:
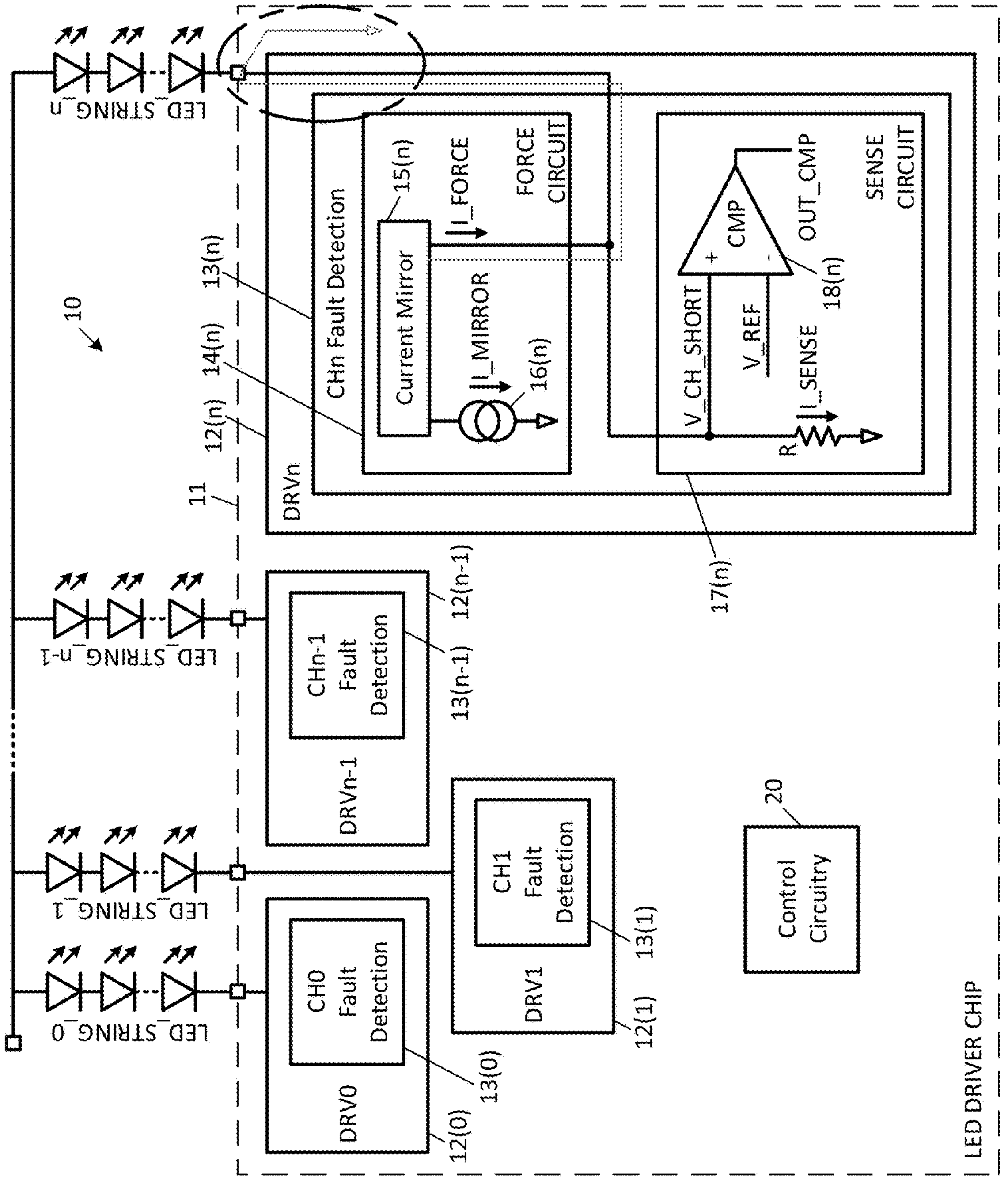
FIG. 5A is a schematic block diagram of the LED lighting system of FIG. 2 when performing fault detection to determine whether a pin associated with a channel is shorted to ground.

Now, detection of shorts between any one of the pins PIN(0), . . . , PIN(n) and ground is described with reference to FIG. 5A. This test is performed for any given driver circuit 12(0), . . . , 12(*n*). In the illustrated example, detection of a short between PIN(n) of the driver circuit 12(*n*) and ground is performed. To accomplish this, the force circuit 14(*n*) and sense circuit 17(*n*) are activated. In the absence of a short between PIN(n) and ground, the activation of the force circuit 14(*n*) serves to source the force current I_FORCE through the resistor R of the sense circuit 17(*n*) to ground since there is not an alternative path for the force current I_FORCE to flow. This causes the voltage V_CH_SHORT across the resistor R of the sense circuit 17(*n*) to rise above the reference voltage V_REF, and therefore the output OUT_CMP of the comparator 18(*n*) is asserted to indicate lack of a short.

Figure 5B:
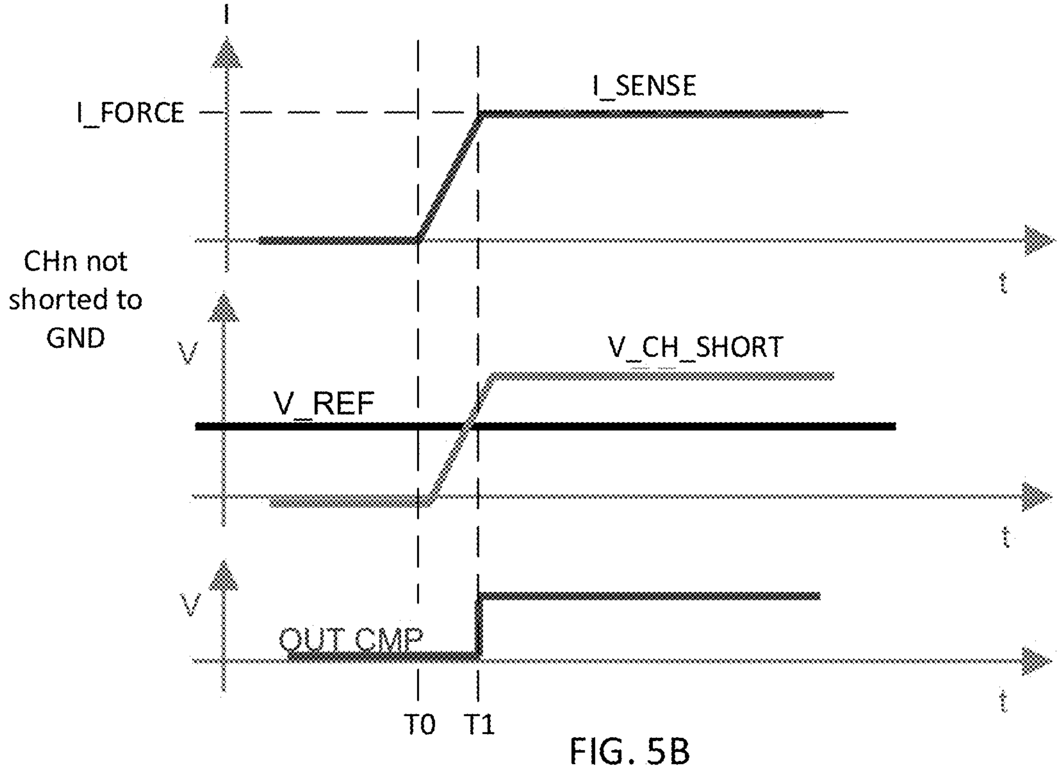
FIG. 5B is a graph showing the operation of the LED lighting system of FIG. 2, when performing fault detection in the absence of a short between a pin associated with a channel and ground.

This scenario can be observed in the graph of FIG. 5B. At time TO, the driver circuit 12(*n*) is activated, and no short is present between PIN(n) and ground. As such, the sense current I_SENSE through resistor R of the sense circuit 17(*n*) rises to become equal to I_FORCE by time T1, resulting in the voltage V_CH_SHORT across the resistor R of the sense circuit 17(*n*) rising above V_REF by time T1 to cause the output OUT_CMP of the comparator 18(*n*) to be asserted at time T1 to indicate a lack of a short.

In the illustrated example, however, there is a short between PIN(n) and ground. As such, when the force circuit 14(*n*) is activated, the force current I_FORCE flows to ground through the pin PIN(n), and therefore the sense current I_SENSE remains substantially at zero, with the result being that the voltage V_CH_SHORT across the resistor R of the sense circuit 17(*n*) remains at ground. The output OUT_CMP of the comparator 18(*n*) consequently remains deasserted to indicate a short between PINn and ground.

Figure 5C:
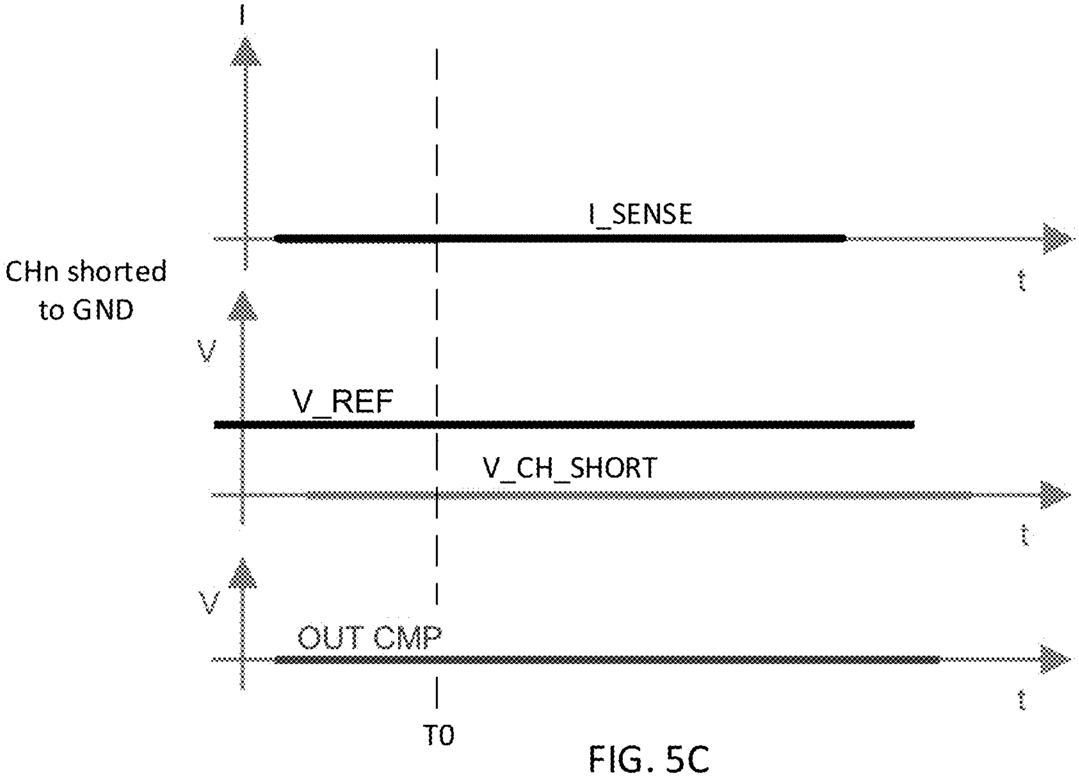
FIG. 5C is a graph showing the operation of the LED lighting system of FIG. 2 when performing fault detection to detect a short between a pin associated with a channel and ground.

This scenario can be observed in the graph of FIG. 5C. At time TO, the driver circuit 12(*n*) is activated, and a short is present between PIN(n) and ground. As such, the force current I_FORCE sourced by the force circuit 14(*n*) flows through pin PIN(n) to ground, with the result being that the sense current I_SENSE and voltage V_CH_SHORT across the resistor R of the sense circuit 17(*n*) remain at zero, and the output OUT_CMP of the comparator 18(*n*) remains deasserted indicating the short between PINn and ground.

The above fault detection hardware and techniques may be utilized in a test mode, for example, to test for shorts between each channel and its adjacent channels, and to test for shorts between each channel and ground. The above fault detection hardware and techniques may also be used during normal operation as a self-test performed immediately before full turn-on of the LED lighting system 10.

As explained above, since the driver circuits 12(0), . . . , 12(*n*) are incorporated in the LED driver chip 11, the fault detection circuits 13(0), . . . , 13(*n*) are incorporated in the LED driver chip 11 and perform fault detection without the use of external equipment and without external inspection. In fact, a short may not only indicate a malfunctioning LED driver chip 11, but may damage the lighting final application. In fact, if a short is present, resulting uncontrolled current could destroy the LEDs and the final application or product into which the LED driver chip 11 is soldered at device powerup, so the LED lighting system 10 described herein also eliminates the possibility of damaging the application without usage of test equipment.

Figure 6:
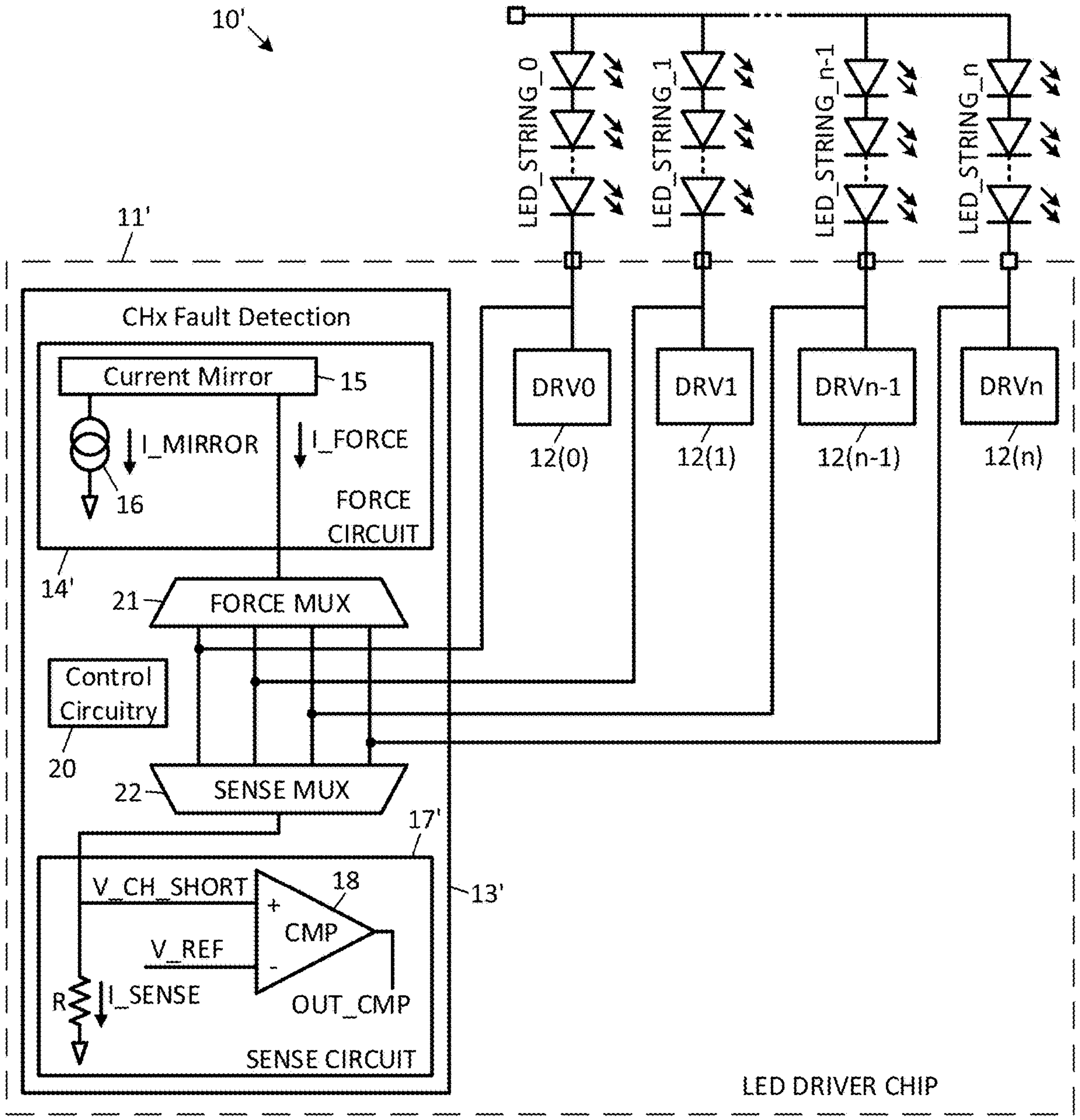
FIG. 6. is a schematic block diagram of another LED lighting system which includes an internal fault detection circuit within its driver chip that can be connected to different channels via multiplexers.

Another LED lighting system 10' is now described with initial reference to FIG. 6. The difference in this LED lighting system 10' and the LED lighting system 10 described above is that here, the LED driver chip 11' includes a single fault detection circuit 13 that uses a single force circuit 14' and a single sense circuit 17' together with two multiplexers 21 and 22 to enable the above described fault detection to be performed for the channels CH0, . . . , CHn without the use of a dedicated fault detection circuit for each individual channel.

The LED driver chip 11' includes a single fault detection circuit 13', as stated, together with a single force circuit 14' and single sense circuit 17' as stated. The force circuit 14' is as described above, with a current mirror 15 that has a current sink 16 connected to its input to sink a mirror current I_MIRROR and provides (sources) a scaled force current I_FORCE at its output. The output of the current mirror 15 is connected to the input of a multiplexer 21 for the force circuit 14'. The multiplexer 21 is controlled by the control circuitry 20.

The sense circuit 17 includes a resistor R connected between the input of de-multiplexer 22 and ground, with a sense current I_SENSE flowing through the resistor R to ground. The sense circuit 17 includes a comparator 18 with its non-inverting input terminal connected to the output of the de-multiplexer 22 and its inverting input terminal coupled to receive the reference voltage V_REF. The comparator 18 outputs a comparison voltage OUT_CMP. The de-multiplexer 22 is controlled by the control circuit 20.

Through proper control of the multiplexer 21 and de-multiplexer 22 by the control circuitry 20, each channel CH0, . . . , CHn can be checked for shorts with its adjacent channel or channels, and each channel CH0, . . . , CHn can be checked for shorts to ground. This enables LED driver chips 11' with a large number of channels to be provided with this fault detection capability without the consumption of a large amount of excess chip area.

Figure 7:
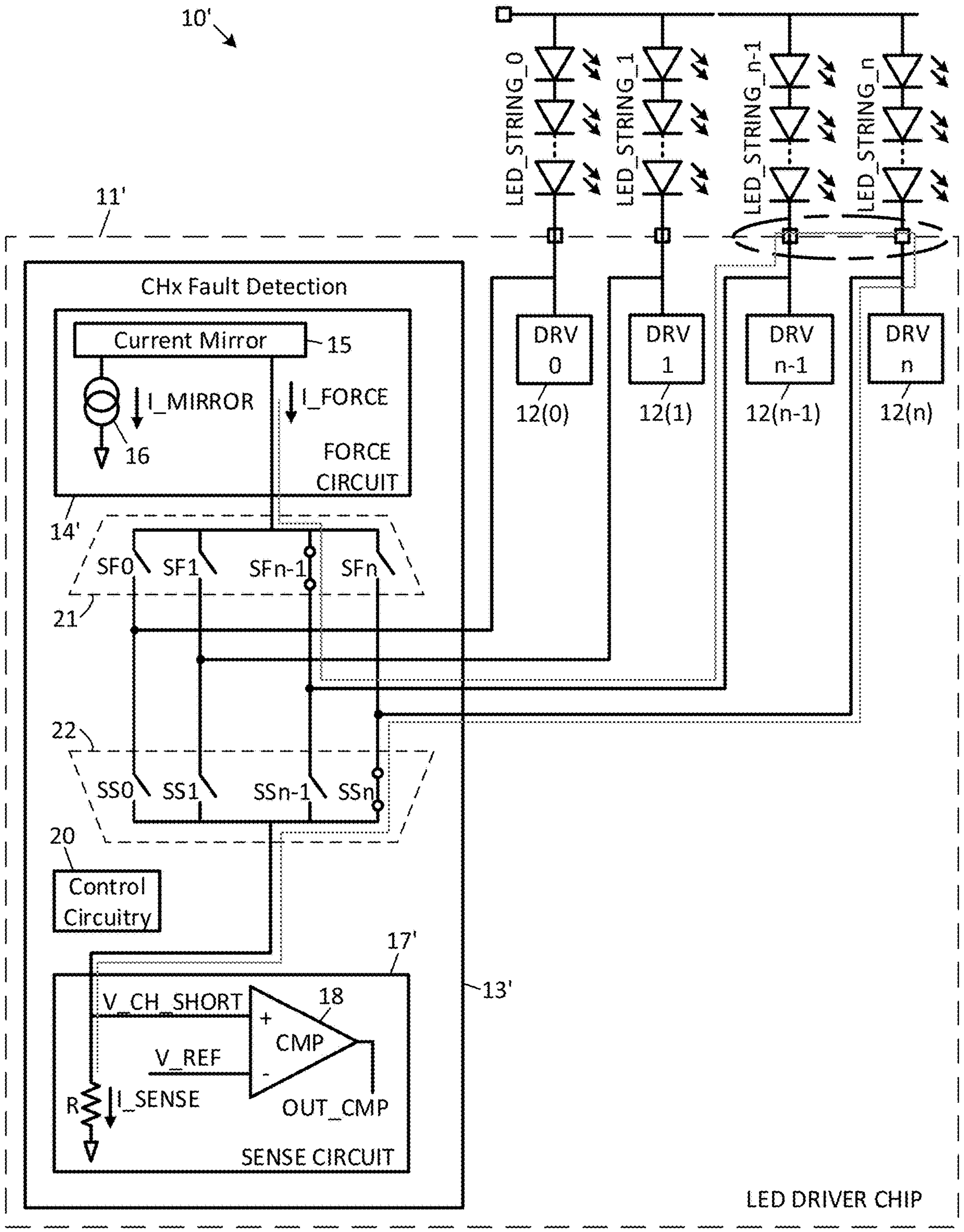
FIG. 7 is a schematic block diagram of the LED lighting system of FIG. 6 when performing fault detection to determine whether adjacent pins associated with different channels are shorted to one another in operation.

First, the testing of shorts between adjacent channels CH0, . . . , CHn is described with additional reference to FIG. 7. Notice that here, the internals of the multiplexer 21 and de-multiplexer 22 are illustrated as switches. The multiplexer 21 includes n switches, SF0, . . . , SFn connected between the output of the current mirror 15 and respective inputs of the de-multiplexer 22, and the de-multiplexer 22 includes n switches, SS0, . . . , SSn connected between the outputs of the multiplexer 21 and the non-inverting terminal of the comparator 18.

In the example of FIG. 7, testing for a short between channels CHn−1 and CHn is being performed. Therefore, switches SFn−1 and SSn are closed, providing for a conductive path between the force circuit 14' and sense circuit 17' if a short is present. If a short is present, as shown, the force current I_FORCE flows out of the force circuit 14', through switch SFn−1 in the multiplexer 21, through the respective conductive trace to the pad for channel CHn−1, through the short, to the pad for channel CHn, through the respective conductive trace, through switch SSn in the de-multiplexer 22, through resistor R, to ground. This results in the voltage V_CH_SHORT across the resistor R rising above the reference voltage V_REF, causing the comparator 18 to assert OUT_CMP at its output, indicating the short between channels CHn−1 and CHn. If the short had not been present, the described current path would not be present, and the voltage V_CH_SHORT would remain below the reference voltage V_REF, and OUT_CMP at the output of the comparator 18 would remain deasserted.

Thus, to test for shorts between any two of the channels CH0, . . . , CHn, a switch SF0, . . . , SFn within the multiplexer 21 associated with one of the channels to test is closed, and a switch SS0, . . . , SSn within the de-multiplexer 22 associated with the other of the channels to test is closed, and assertion of OUT_CMP results if a short is present between those two channels.

Figure 8:
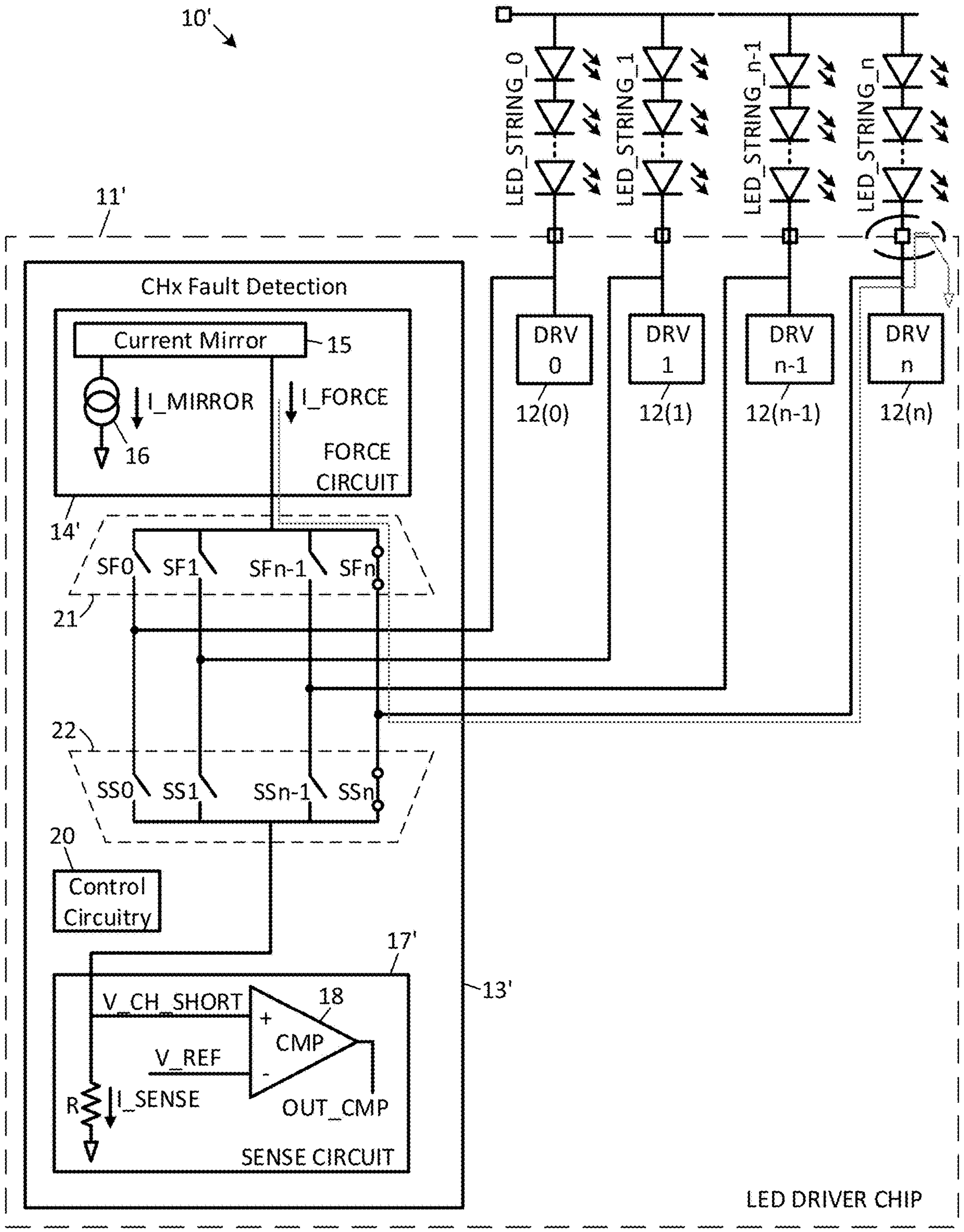
FIG. 8 is a schematic block diagram of the LED lighting system of FIG. 6 when performing fault detection to determine whether a pin associated with a channel is shorted to ground.

Now, testing of a short between channels CH0, . . . , CHn and ground is described with reference to FIG. 8. In this example, channel CHn is being tested for a short to ground. Therefore, switch SFn is closed, providing for a conductive path between force circuit 14', through switch SFn, through the respective conductive trace to the pad for channel CHn, through the short to ground.

This results in the voltage V_CH_SHORT remaining below the reference voltage V_REF, and OUT_CMP at the output of the comparator 18 remaining deasserted. Note that switch Ssn is also closed, and therefore if the short between the pad for channel CHn and ground is not present, the current will flow from the force circuit 14' through to the sense circuit 17' and V_CH_SHORT will rise above V_REF to assert OUT_CMP at the output of the comparator 18. Thus, when performing tests for shorts between the channel and ground, OUT_CMP being asserted indicates a lack of a short.

Thus, to test for shorts between any channel CH0, . . . , CHn and ground, a switch SF0, . . . . SFn within the multiplexer 21 associated with the channel to test is closed, and a switch SS0, . . . , SSn within the de-multiplexer 22 associated with the channel to test is closed, and OUT_CMP remains deasserted if a short is present.

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A light emitting diode (LED) lighting system, comprising:
- a plurality of strings of LEDs;
- an LED driver chip comprising a plurality of driver circuits, each coupled to a different one of the plurality of strings of LEDs via a respective pin;
- wherein each of the plurality of driver circuits includes a fault detection circuit for that driver circuit;
- wherein each fault detection circuit comprises a force circuit including a current sourcing circuit configured to source a forcing current to a force output node;
- wherein each fault detection circuit further comprises a sense circuit, each sense circuit comprises:
  - a current sensor coupled to the force output node; and
  - a comparator configured to compare a voltage at the force output node to a reference voltage and generate a comparison output based thereupon; and
- control circuitry configured, in a pin-to-pin short detection mode, to:
  - activate the force circuit of a first given one of the plurality of driver circuits;
  - activate the sense circuit of a second given one of the plurality of driver circuits; and
  - when the comparison output of the comparator of the activated sense circuit indicates that the voltage at its force output node is greater than the reference voltage, indicate presence of a short between the respective pin for the first given one of the plurality of driver circuits and the respective pin for the second given one of the plurality of driver circuits.

2. The LED lighting system of claim 1, wherein the control circuitry is further configured, in a pin-to-ground short detection mode, to:
- activate the force circuit and sense circuit of a given one of the plurality of driver circuits; and
- when the comparison output of the comparator of the given one of the plurality of driver circuits indicates that the voltage at the force output node is less than the reference voltage, determine presence of a short between the pin for the respective given one of the plurality of driver circuits and ground.

3. The LED lighting system of claim 1, wherein the current sensor comprises a resistor connected between the force output node and ground.

4. The LED lighting system of claim 3, wherein the comparator has a non-inverting terminal coupled to the force output node and an inverting terminal coupled to the reference voltage.

5. The LED lighting system of claim 1, wherein the current sourcing circuit comprises a current mirror having an input coupled to a current source sinking a mirror current and an output at which the forcing current is sourced as being a scaled version of the mirror current.

6. The LED lighting system of claim 1, wherein each of the plurality of strings of LEDs comprises a plurality of LEDs connected in series between an LED supply voltage node and the pin associated with that one of the plurality of strings of LEDs.

7. A light emitting diode (LED) driver chip, comprising:
- a plurality of driver circuits, each being coupled to a different pin;
- wherein each of the plurality of driver circuits includes a fault detection circuit for that driver circuit;
- wherein each fault detection circuit comprises a force circuit including a current sourcing circuit configured to source a forcing current to a force output node;

wherein each fault detection circuit further comprises a sense circuit, each sense circuit comprising:
a current sensor coupled to the force output node; and
a comparator configured to compare a voltage at the force output node to a reference voltage and generate a comparison output based thereupon;
control circuitry configured, in a pin-to-pin short detection mode, to:
activate the force circuit of a first given one of the plurality of driver circuits;
activate the sense circuit of a second given one of the plurality of driver circuits; and
when the comparison output of the comparator of the activated sense circuit indicates that the voltage at its force output node is greater than the reference voltage, determine presence of a short between a pin of the first given one of the plurality of driver circuits and a pin of the second given one of the plurality of driver circuits; and
the control circuitry being further configured, in a pin-to-ground short detection mode, to:
activate the force circuit and sense circuit of a given one of the plurality of driver circuits; and
when the comparison output of the comparator of the given one of the plurality of driver circuits indicates that the voltage at the force output node is less than the reference voltage, determine presence of a short between a pin of the given one of the plurality of driver circuits and ground.

8. The LED driver chip of claim 7, wherein the current sensor comprises a resistor connected between the force output node and ground.

9. The LED driver chip of claim 8, wherein the comparator has a non-inverting terminal coupled to the force output node and an inverting terminal coupled to the reference voltage.

10. The LED driver chip of claim 7, wherein the current sourcing circuit comprises a current mirror having an input coupled to a current source sinking a mirror current and an output at which the forcing current is sourced as being a scaled version of the mirror current.

11. A light emitting diode (LED) lighting system, comprising:
a plurality of LED strings;
an LED driver chip with a plurality of driver circuits, each connected to a different one of the plurality of LED strings via a pin;
wherein each driver circuit of the plurality of driver circuits includes a fault detection circuit having:
a force circuit with a current sourcing circuit configured to supply forcing current to a force output node; and
a sense circuit having:
a current sensor connected to the force output node; and
a comparator configured to compare a voltage at the force output node with a reference voltage and generate a comparison output; and
control circuitry, configured, in pin-to-pin short detection mode, to:
activate the force circuit of a first driver circuit;
activate the sense circuit of a second driver circuit; and
determine presence of a short between pins when the comparison output indicates that the voltage at the force output node exceeds the reference voltage;
wherein the control circuitry, in pin-to-ground short detection mode, is configured to:
activate the force and sense circuits of a given driver circuit; and
determine presence of a short to ground when the comparison output indicates that the voltage at the force output node is less than the reference voltage.

12. The LED lighting system of claim 11, wherein the current sensor comprises a resistor connected between the force output node and ground.

13. The LED lighting system of claim 12, wherein a non-inverting terminal of the comparator is coupled to the force output node, and an inverting terminal of the comparator is coupled to the reference voltage.

14. The LED lighting system of claim 11, wherein the current sourcing circuit comprises a current mirror with an input coupled to a current source sinking a mirror current, and with an output sourcing the forcing current as a scaled version of the mirror current.

15. The LED lighting system of claim 11, wherein each LED string of the plurality thereof has multiple LEDs connected in series between an LED supply voltage node and the pin associated with that string.

16. A light emitting diode (LED) lighting system, comprising:
a plurality of strings of LEDs;
an LED driver chip comprising a plurality of driver circuits, each being coupled to a different one of the plurality of strings of LEDs via a respective pin;
a multiplexing circuit having a different respective output connected to each of the plurality of driver circuits;
a de-multiplexing circuit having a different respective input connected to each of the plurality of driver circuits;
a fault detection circuit comprising:
a force circuit including a current sourcing circuit configured to source a forcing current to an input of the multiplexing circuit; and
a sense circuit comprising:
a current sensor coupled to an output of the de-multiplexing circuit; and
a comparator configured to compare a voltage at the output of the de-multiplexing circuit to a reference voltage and generate a comparison output based thereupon; and
control circuitry configured, in a pin-to-pin short detection mode, to:
cause the multiplexing circuit to connect the force circuit to a first given one of the plurality of driver circuits;
cause the de-multiplexing circuit to connect the sense circuit to a second given one of the plurality of driver circuits; and
when the comparison output of the comparator of the sense circuit indicates that the voltage at the output of the demultiplexing circuit is greater than the reference voltage, indicate presence of a short between the respective pin for the first given one of the plurality of driver circuits and the respective pin for the second given one of the plurality of driver circuits.

17. The LED lighting system of claim 16, wherein the control circuitry is further configured, in a pin-to-ground short detection mode, to:
cause the multiplexing circuit to connect the force circuit to a given one of the plurality of driver circuits;
cause the de-multiplexing circuit to connect the sense circuit to the given one of the plurality of driver circuits; and when the comparison output of the comparator indicates that the voltage at the output of the demultiplexing circuit is less than the reference voltage, determine presence of a short between the pin for the respective given one of the plurality of driver circuits and ground.

18. The LED lighting system of claim 16, wherein the current sensor comprises a resistor connected between the output of the demultiplexing circuit and ground.

19. The LED lighting system of claim 16, wherein the comparator has a non-inverting terminal coupled to the output of the demultiplexing circuit and an inverting terminal coupled to the reference voltage.

20. The LED lighting system of claim 16, wherein the current sourcing circuit comprises a current mirror having an input coupled to a current source sinking a mirror current and its output at which the forcing current is sourced as being a scaled version of the mirror current.

* * * * *